United States Patent [19]

Carrell

[11] Patent Number: 4,634,328

[45] Date of Patent: Jan. 6, 1987

[54] MAIL SINGULATION SYSTEM

[75] Inventor: Ross M. Carrell, Cinnaminson, N.J.

[73] Assignee: RCA Corporation, Princeton, N.J.

[21] Appl. No.: 739,917

[22] Filed: May 31, 1985

[51] Int. Cl.$^4$ .............................................. B65H 7/20
[52] U.S. Cl. ..................... 414/117; 198/444;
198/463.4; 209/900; 271/227; 271/237; 271/263
[58] Field of Search ............ 209/552, 517, 518, 521,
209/576, 586, 587, 598, 900, 939; 198/443, 444,
453, 459, 460, 463.4; 271/227, 228, 237, 262,
263; 250/223 R; 356/376; 358/96, 101, 903;
364/478, 479; 382/1, 8; 414/112, 117, 120;
901/7, 46, 47

[56] References Cited

U.S. PATENT DOCUMENTS

| | | | |
|---|---|---|---|
| 2,924,323 | 2/1960 | Holben | 198/463.4 X |
| 3,187,185 | 6/1965 | Milnes | 358/96 X |
| 3,236,355 | 2/1966 | Barnard et al. | 198/444 |
| 3,251,452 | 5/1966 | Conway et al. | 198/460 |
| 3,260,521 | 7/1966 | Moxness | 271/39 |
| 3,446,500 | 5/1969 | Meier | 271/62 |
| 3,485,339 | 12/1969 | Miller et al. | 198/460 |
| 3,866,740 | 2/1975 | Greathead | 198/460 |
| 4,149,622 | 4/1979 | Bradshaw et al. | 198/444 |
| 4,150,743 | 4/1979 | Lazzaroti et al. | 198/444 X |
| 4,171,744 | 10/1979 | Hubbard | 209/586 |

FOREIGN PATENT DOCUMENTS 2551846  6/1977  Fed. Rep. of Germany ...... 414/117

Primary Examiner—Robert B. Reeves
Assistant Examiner—Edward M. Wacyra
Attorney, Agent, or Firm—Joseph S. Tripoli; Robert L. Troike; Raymond E. Smiley

[57] ABSTRACT

A singulation system for receiving unsingulated mail at a singulation station and for passing to an output station singulated mail. The singulation system includes a camera for viewing the unsingulated mail at the output edge of the singulation station for determining a profile of the top piece of unsingulated mail and a positionable lip at the output edge of the singulation station responsive to the signal indicating the profile for becoming shaped to the profile so that the upper piece of unsingulated mail can be passed over the lip to an output station.

9 Claims, 4 Drawing Figures

MAIL SINGULATION SYSTEM

BACKGROUND OF INVENTION

1. Field of Invention

This invention is directed to apparatus for singulating generally flat material such as mail and more particularly to such apparatus involving unattended operation.

2. Description of the Prior Art

The automatic singulation (separation) of odd shaped mailpieces from a stack of such pieces has historically been a problem. The type of mail falling into the category of odd shaped mailpieces includes, but is not limited to, newspapers, magazines, film for developing, developed film, boxes of new checks, envelopes with return checks and so called "flimsies". An example of a flimsie is a computer generated invoice where the invoice is already inside the envelope when the computer information is added. Such envelopes and invoices are made of extremely thin paper thus giving rise to the name of "flimsie".

The common approach to singulation is to manually singulate such pieces. Automation attempts include having a pusher that ideally pushes one item at a time from a stack or loosely layered pieces onto a take away conveyor while a raised lip prevents other items from passing to the take away conveyor. Unfortunately, due to the shape of the above-mentioned types of mail, the pushing effort often results in two or more pieces of mail being simultaneously passed to the take away conveyor and therefore remaining unsingulated or results in crushing of mailpieces against the lip. This later problem typically occurs when a relatively large and floppy piece of mail, a newspaper for example, is partially resting above a smaller chunky piece of mail, a box of checks for example.

SUMMARY OF THE INVENTION

In accordance with a preferred embodiment of the present invention a mail singulation system including a singulation station having an output edge, means for inputting unsingulated mail into the singulation station and means for removing singulated mail from the output edge of the singulation station comprises in combination, first means for viewing the unsingulated mail in said singulation station near the output edge thereof for producing a signal indicative of the mail profile as viewed from the output edge, and a lip at said output edge of the singulation station. The lip includes second means responsive to the signal from said first means for moving said lip to form a shape corresponding to the shape of the mail profile.

DETAILED DESCRIPTION OF A PREFERRED EMBODIMENT

Figure 1:
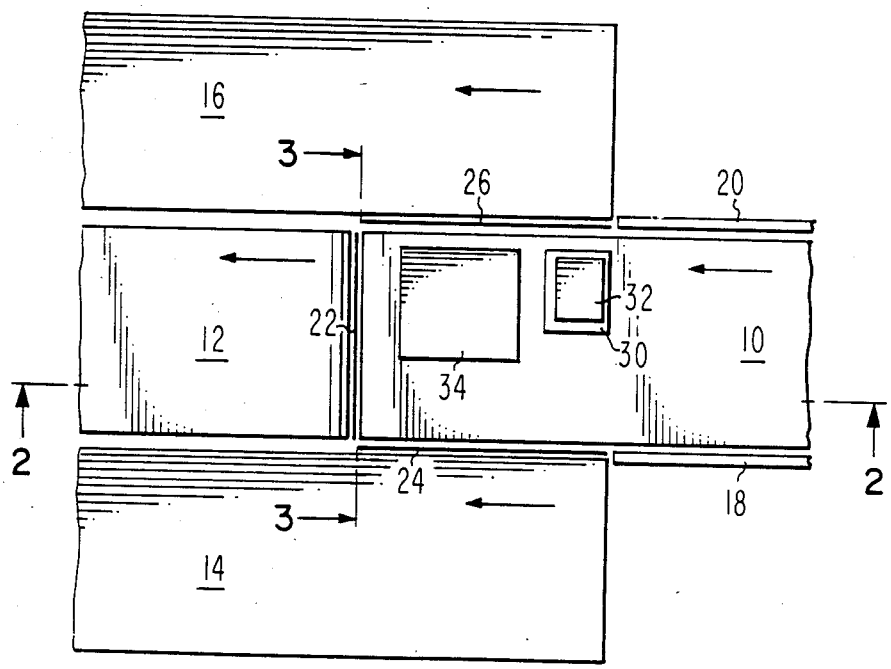
FIG. 1 is a plan view of a mail singulation system with vision system parts (visible in FIG. 2) missing for drawing clarity.

Referring first to FIG. 1, four conveyor belts of conventional design are illustrated. They are input conveyor 10, main takeaway conveyor 12 and auxiliary take away conveyors 14 and 16. Guides 18 and 20 are positioned along the two sides respectfully of input conveyor 10 so that mail does not fall off the conveyor. Although take away conveyor 12 or some equivalent thereof is necessary to the operation of the system, take away conveyors 14 and 16 are not necessary and are only useful for increased throughput as will be described in more detail hereinafter. Positioned between each take away conveyor utilized and input conveyor 10 is an adjustable lip. In FIG. 1 these lips are illustrated as straight lines 22, 24, and 26 respectively. The nature of these lips will be expanded upon hereinafter. In FIG. 1 a few pieces of exemplary mail 30, 32 and 34 are illustrated. In reality many more pieces of mail would be normally present in the area illustrated in FIG. 1 but these pieces serve to show the principle. The area bounded by lines (lips) 22, 24 and 26 and a line extending between the illustrated ends of conveyors 14 and 16 defines a singulation station. The singulation station could, instead of being part of conveyor 10, comprise a container in which is piled mail of various sizes and shapes.

Figure 2:
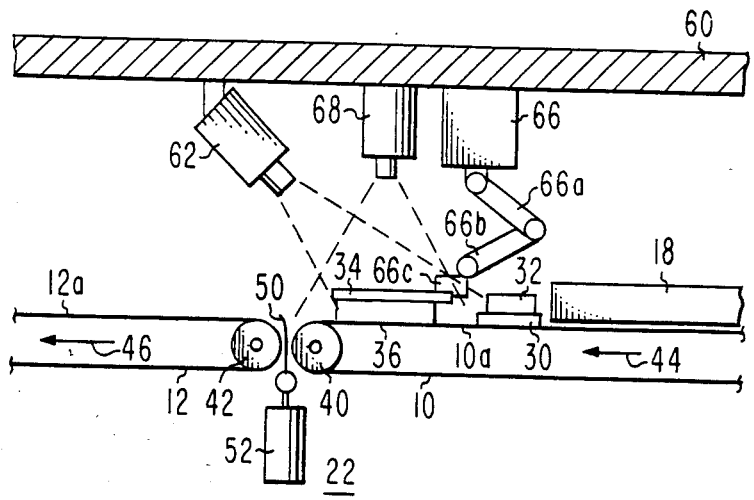
FIG. 2 is a cross-section elevation view along lines 2—2 of FIG. 1 and including vision system parts.
Figure 4:
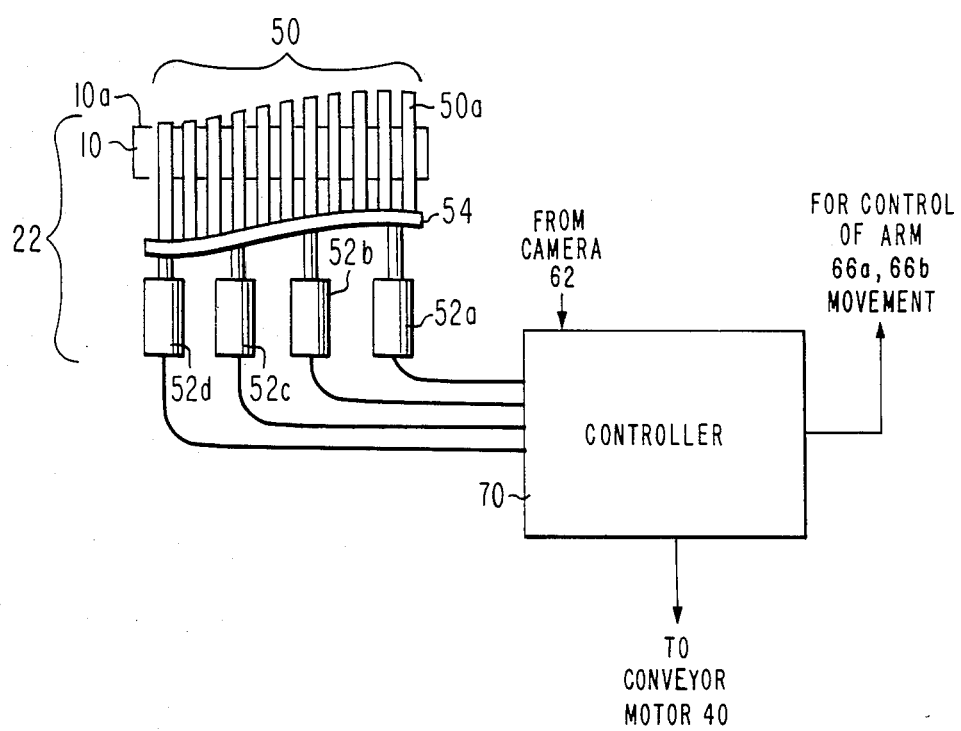
FIG. 4 illustrates an adjustable lip in elevation view, the lip being located just to the left of lines 3—3 in FIG. 1 and also including an electrical interconnection block diagram of the various electrical components of the mail singulation system.

Referring now to FIG. 2 conveyors 10 and 12 are illustrated in cross section. A combined guide roller and motor 40 is positioned at one end of conveyor 10 for moving the upper surface 10a thereof in the direction indicated by arrow 44. Similarly conveyor 12 includes a similarly combined guide roller and motor 42 positioned at one end of conveyor 12 for moving the upper surface 12a in the direction indicated by arrow 46. In FIG. 2 conveyors 14 and 16 are not illustrated for reasons of drawing clarity. In FIG. 2 adjustable height lip assembly 22 is illustrated with one of its several height adjusting mechanisms 52. Lip 22 is better illustrated in FIG. 4 to which attention is now directed. In that figure conveyor 10 is illustrated in dashed line form with upper surface 10a thereof as legended. In FIG. 4 lip 22 is seen to comprise a plurality of fingers 50 such as 50a there being 12 such fingers illustrated all connected to a common flexible member 54. Material 54 may typically be made of some sort of flexible material such as spring steel, neoprene or other rubber compound or suitable flexible plastic while fingers 50 are typically made of a spring metal or flexible plastic.

Mechanisms 52, (Specific ones thereof are labeled 52a, 52b, 52c, and 52d respectfully, but when referred to as a group will be simply referred to as mechanisms 52.) are attached at spaced apart points along material 54. Each of the mechanisms 52 by way of example, may consist of a rack and pinion driven by a stepping motor or servomotor which can move one point of the flexible member 54 to a specific position in response to commands from controller 70. Mechanisms 52 may alternatively comprise ball screws, hydraulic cylinders and similar means well known in the art.

Since each unit of mechanisms 52 can position a point of flexible member 54 at a specific location, it follows that member 54 can be made to conform to a variety of curvilinear shapes and vertical positions in response to commands from controller 70.

The fingers 50 attached to flexible member 54 replicate this curved shape, forming a programmable lip.

The use of individual fingers allow the lip to have a curved or shaped form in direction 46 (FIG. 2) and a variable shape in the vertical plane as illustrated in FIG. 2.

Returning now to FIG. 2 there is illustrated mounted above the upper surfaces 10a and 12a of conveyors 10 and 12 respectively a suspended ceiling 60 from which are suspended a number of items.

One item is a slide projector 68 of ordinary construction which projects a pattern of light stripes over the area determined by end of conveyor 10 and a line projected between the ends of conveyors 14 and 16 as seen in FIG. 1.

Another item is a television camera 62 preferably utilizing a solid state array sensor; such sensors are well known to provide stable geometric precision and are widely used in machine vision application.

The distance between projector 68 and camera 62 forms the base of a set of triangles whose sides are formed by the path of light in any specific projected stripe from projector 68, to the surface of mailpiece 34 and then to a specific element in the array in camera 62. Since the angles are known by calibration, it is possible to determine the locations of many points on the surface of mailpiece 34, and from these points to infer the location and surface contour of mailpiece 34.

This general technique and the mathematics supporting it are well known in the industry. The algorithms necessary for operating the vision system are executed in controller 70.

Also mounted from ceiling 60 is means for moving individual pieces of mail from conveyor 20 across lip 22 to conveyor 12. Such means may take this form of robot 66 of conventional design such as the model PUMA 560 manufactured by Animation Inc. of Danbury, Conn.

Robot 66 includes articulating arms 66a and 66b respectively and an end effector 66c the purpose of which is to push pieces of mail such as 34 across lip 50 and onto surface 12a of take away conveyor 12. The term "end effector" refers to that part of the robot which manipulates a workpiece (here mail) by whatever means which may or may not involve gripping as that term is normally used. Components necessary to allow for operation of take away conveyors 14 and 16 are not illustrated in FIG. 2. Should such conveyors be utilized, then lip 22 and mechanisms 52 would all have to be duplicated for each of the other conveyors oriented essentially 90° clockwise and counterclockwise respectively as viewed looking down on suspended ceiling 60 relative to the arrangement illustrated in FIG. 2. A second camera mounted over conveyor 16 or 14 would be useful in determining the contours of the edges of mailpiece 34 facing the lips 24 and 26. No duplication of robot 66 would be needed since it is able to push mailpieces in any direction. The data on the surface contour and position of mailpice 34 is also used to direct the robot to position its end effector on the mailpiece and shove it in the desired direction.

Figure 3:
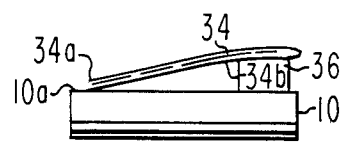
FIG. 3 is a cross-section elevation view along lines 3—3 of FIG. 1 illustrating a typical mail singulation situation.

Turning for a moment to FIG. 3 there is illustrated a typical mail singulation situation. In FIG. 3 a box of checks 36 is resting on the upper surface 10a of conveyor 10. A newspaper or magazine 34 is resting partly atop box 36 and partly on upper surface of conveyor 10a. That is mailpiece 34 is not parallel to conveyor surface 10a. If a conventional fixed lip arrangement were provided, the lip would either have to be low in which case both mailpieces 34 and 36 may be pushed by robot 66 onto take away conveyor 12a or the lip would be positioned relatively high relative to the upper surface 10a of conveyor 10 in which case end 34a of mailpiece 34 would likely be crushed by the lip as robot 66 attempted to pushed mailpiece onto take away conveyor 12.

In accordance with the present invention however since lip 22 (and more particularly fingers 50 thereof) is adjustable in elevational position such problem as described in connection with FIG. 3 is avoided as described hereinafter.

Turning now to FIG. 4 the mechanisms 52 are all connected to an electrical controller device 70 as is the output of camera 62. An output of controller 70 is connected to conveyor motor 40 and optionally, although not illustrated, could be connected to conveyor motor 42 controlling conveyor 12 and to motors (not shown) controlling conveyors 14 and 16. Controller 70 is also connected to robot 66 providing signals thereto for controlling the movement of arm sections 66a and 66b thereof. The operation of robot 66 is rather complex but the principles are well known and will not be presented herein.

Operation of the singulation system is as follows. Assume initially that mailpieces 34 and 36 (FIG. 3) are some distance away from fingers 50 of lip 22 (FIG. 4) and with no mailpieces between them and fingers 50. Further assume that piece 34 is on top of piece 36 as illustrated in FIG. 3. Then controller 70 will send a signal to cause motor 40 to move mailpieces 34 and 36 until they arrive in the vicinity of fingers 50. The actual system for sensing whether mail is or is not in the vicinity of fingers 50 is not illustrated but may be, for example, a standard "electric eye".

Furthermore controller 70 sends appropriate signals to mechanisms 52a, 52b, 52c and 52d (FIG. 4) to lower fingers 50 down below or even with top surface 10a (FIG. 2) of conveyor 10. Also at that time camera 62 scans the edge of the mailpieces which are near fingers 50, that is mailpieces 34 and 36, and sends a profile of the bottom surface 34b of upper mailpiece 34 to controller 70. Camera 62 is able to do this because, by proper placement of light source 68, a pattern of light stripes can be cast on the surface of mailpiece 34. By means of the stripes, controller 70 can determine the elevational location of the edge across conveyor 10, that is from left-to-right or right-to-left in FIG. 3. An example of structure utilizing light stripes to determine the location of an object will be found in U.S. Pat. No. 4,175,862 issued Nov. 27, 1979, to Paul Dimatteo, entitled "Arrangement for Sensing the Geometric Characteristics of an Object." Controller 70 upon receiving signals from camera 62 sends appropriate signals to mechanisms 52a . . . 52d to adjust fingers 50 to correspond in height to the undersurface 34b of mailpiece 34.

Once fingers 50 are positioned such as to be in the shape of mailpiece 34 and corresponding substantially in height to the bottom surface 34b thereof controller 70 issues appropriate commands to robot 66. The commands cause upper arm 66a and lower arm 66b and gripper 66c to move in such a manner as to move mailpiece 34 off of mailpiece 36 across fingers 50 and onto surface 12a of take away conveyor 12 while mailpiece 36 remains stationary prevented from movement by fingers 50. Under normal operation take away conveyor 12 will be moving at all times by means of motor 42.

After mailpiece 34 is removed, camera 62 senses the bottom line of mailpiece 36 which in this case is the upper surface 10a of conveyor 10 so that fingers 50 are caused, under control of controller 70, to be moved level with the upper surface 10a of conveyor 10. Then again under control of controller 70 robot 66 and particularly gripper 66c thereof causes mailpiece 36 to be pushed off of conveyor 10 across fingers 50 and onto take away conveyor 12. At that point controller 70 causes motion in motor 40, bringing mailpieces 30 and 32 into position to the singulation station and the process above described repeats.

The above described process can be relatively slow. An increase in speed may be effected by having more than one take away conveyor and more than one lip such as 22. That is the reason for the presence of conveyors 14 and 16 and corresponding lips 24 and 26 respectively. With two or three take away conveyors the operation is the same as with one take away conveyor except that additional cameras similar to camera 62 are provided. The additional cameras are positioned to view conveyor surface 10a near lips 24 and 26. These cameras can, in turn, detect the presence of raised packages rear lips 24 and 26 and then robot 66 can be controlled to alternately push mailpieces toward conveyors 12, 14, and 16 in order.

It will be understood that the term "mail" or "mailpiece" is not limited to U.S. Mail, and in fact can be any sort of items or parcels which are jumbled and must be singulated for some further action. The mailpieces for example could be parts in a factory and can include relatively large packages as well as the relatively small type of packages that have been used as examples in the background section of the instant application.

What is claimed is:

1. A mail singulation system including a singulation station having an output edge, means for inputting unsingulated mail into said singulation station and means for carrying singulated mail from said output edge of said singulation station, comprising in combination:
   first means for viewing said unsingulated mail in said singulation station at said output edge for producing a signal indicative of the profile of a single piece of said unsingulated mail as viewed from said output edge; and
   an adjustable lip positioned at said output edge of said singulation station;
   said lip including second means responsive to said signal from said first means for moving said lip to a shape corresponding to the shape of said single piece of mail.

2. The combination as set forth in claim 1 further including means for moving the piece of mail, the profile of which was determined, over said lip and onto said means for carrying singulated mail from said output edge of said singulation station.

3. The combination as set forth in claim 2 wherein said means for moving said mail to said output station comprises a robot.

4. The combination as set forth in claim 1 wherein said lip comprises a plurality of finger like elements spaced in a plane and parallel to one another, and a flexible member also in said plane to which one end of each of said finger-like members is secured and wherein said second means comprises means attached at various places along said flexible member.

5. The combination as set forth in claim 1 further including means for providing a signal indicating when said unsingulated mail is in proximity with said output edge of said singulation station, said signal being coupled to said means for inputting unsingulated mail into said singulation station and for stopping the movement of said mail when said mail is in said proximity with said output edge.

6. The combination as set forth in claim 1 wherein said singulation station includes an additional edge from which singulated mail can be passed from said singulation station and further includes an additional means for carrying singulated mail from said additional edge of said singulation station.

7. The combination as set forth in claim 6 wherein said first means for viewing unsingulated mail also includes means for viewing unsingulated mail from said additional edge at which said additional output means is positioned and further including an additional adjustable lip positioned between said additional edge of said singulation station and said additional output means said additional lip including third means responsive to said signal from said first means for moving said lip to a shape corresponding to the shape of said single piece of mail as viewed from said additional edge of said singulation station.

8. The combination as set forth in claim 1 wherein said means for bringing said mail to said singulation station comprises a conveyor and wherein said means for carrying singulated mail comprises a second conveyor.

9. The combination as set forth in claim 8 wherein said singulation station is an extension of said conveyor for inputting said mail such that one end of said conveyor is considered to be said singulation station.

* * * * *